(12) United States Patent
Mont et al.

(10) Patent No.: US 10,536,483 B2
(45) Date of Patent: Jan. 14, 2020

(54) SYSTEM AND METHOD FOR POLICY GENERATION

(75) Inventors: Marco Casassa Mont, Bristol (GB); Siani Pearson, Llanvaches (GB); Pete Bramhall, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 144 days.

(21) Appl. No.: 14/118,847

(22) PCT Filed: Jun. 16, 2011

(86) PCT No.: PCT/US2011/040658
§ 371 (c)(1),
(2), (4) Date: Nov. 19, 2013

(87) PCT Pub. No.: WO2012/173626
PCT Pub. Date: Dec. 20, 2012

(65) Prior Publication Data
US 2014/0096188 A1    Apr. 3, 2014

(51) Int. Cl.
*G06F 17/00* (2019.01)
*H04L 29/06* (2006.01)

(52) U.S. Cl.
CPC .................. *H04L 63/20* (2013.01)

(58) Field of Classification Search
CPC ... G06F 9/542; G06F 21/604; H04L 63/1416; H04L 63/102; H04L 63/20; H04L 63/108; H04L 63/08; H04L 63/62; G06Q 10/0637
See application file for complete search history.

(56) References Cited

U.S. PATENT DOCUMENTS

| | | | |
|---|---|---|---|
| 6,393,474 B1 | 5/2002 | Eichert et al. | |
| 6,466,932 B1 * | 10/2002 | Dennis | G06F 21/10 |
| | | | 707/694 |
| 7,185,073 B1 | 2/2007 | Gai et al. | |
| 7,484,237 B2 | 1/2009 | Joly et al. | |
| 7,546,633 B2 | 6/2009 | Garg et al. | |

(Continued)

FOREIGN PATENT DOCUMENTS

| | | |
|---|---|---|
| CN | 101072138 A | 11/2007 |
| CN | 101916404 A | 12/2010 |

(Continued)

OTHER PUBLICATIONS

Johnson, et al.: "Optimizing a Policy Authoring Framework for Security and Privacy Policies"; http://cups.cs.cmu.edu/soups/2010/proceedings/a8_johnson.pdf ; Jul. 14-16, 2010: pp. 1-9.

(Continued)

*Primary Examiner* — Shewaye Gelagay
*Assistant Examiner* — Carlton Johnson
(74) *Attorney, Agent, or Firm* — Hewlett Packard Enterprise Patent Department

(57) ABSTRACT

One example provides a collaborative policy refinement service to aggregate policy inputs from organizational layers and to generate security policies that are consistent across the organizational layers. This includes an interactive policy component to facilitate collaborative interaction between the organizational layers and to facilitate determination of the security policies.

14 Claims, 6 Drawing Sheets

(56) References Cited

U.S. PATENT DOCUMENTS

| | | | |
|---|---|---|---|
| 2001/0018746 A1 | 8/2001 | Lin | |
| 2002/0059471 A1* | 5/2002 | Sanghvi | G06F 9/542 |
| | | | 719/318 |
| 2004/0111643 A1 | 6/2004 | Farmer | |
| 2004/0168152 A1* | 8/2004 | Kramer | G06F 8/71 |
| | | | 717/120 |
| 2005/0010765 A1 | 1/2005 | Swander et al. | |
| 2006/0167858 A1 | 7/2006 | Dennis et al. | |
| 2007/0113288 A1* | 5/2007 | Blumenau | G06F 21/6218 |
| | | | 726/26 |
| 2008/0059474 A1 | 3/2008 | Lim | |
| 2008/0184336 A1 | 7/2008 | Sarukkai et al. | |
| 2010/0054241 A1* | 3/2010 | Shah | H04L 45/00 |
| | | | 370/389 |
| 2011/0061089 A1* | 3/2011 | O'Sullivan | H04L 63/102 |
| | | | 726/1 |

FOREIGN PATENT DOCUMENTS

| | | | | |
|---|---|---|---|---|
| JP | H09-069077 | | 3/1997 | |
| JP | 2002-204254 A | | 7/2002 | |
| JP | 2006-184936 A | | 7/2006 | |
| JP | 2008117026 A | | 5/2008 | |
| WO | WO-2010092755 A1 | | 8/2010 | |
| WO | WO 2010100590 A1 | * | 9/2010 | G06F 19/322 |
| WO | WO-2011061804 A1 | | 5/2011 | |

OTHER PUBLICATIONS

Keeney, et al.: "Towards the Visualisation of Colaborative Policy Decomposition"; http://ieeexplore.ieee.org/stamp/stamp.jsp?arnumber=4556579 ; Jun. 2-4, 2008; pp. 65-69.

International Search Report for corresponding PCT/US2011/040658, completed Feb. 13, 2012 by You Chul Shin of the KIPO.

Extended European Search Report received in EP Application No. 11867722.8, dated Nov. 12, 2014, 7 pages.

Kodeswaran, P. et al., "Enforcing Security in Semantics Driven Policy Based Networks," Computer Standards & Interfaces 33.1, 2011, 8 pages.

* cited by examiner

SYSTEM AND METHOD FOR POLICY GENERATION

RELATED APPLICATION

This application is a U.S. National Phase Patent which claims priority from PCT Application Serial No. PCT/US2011/040658, filed 16 Jun. 2011 the entirety of which is incorporated herein.

BACKGROUND

Distributed computing is an area of computer science that typically involves distributed systems, where a distributed system generally consists of multiple autonomous computers (or computer tasks) that communicate through a computer network. A computer program that runs in a distributed system is referred to as a distributed program, where distributed programming is the process of writing such programs.

DETAILED DESCRIPTION

Figure 1:
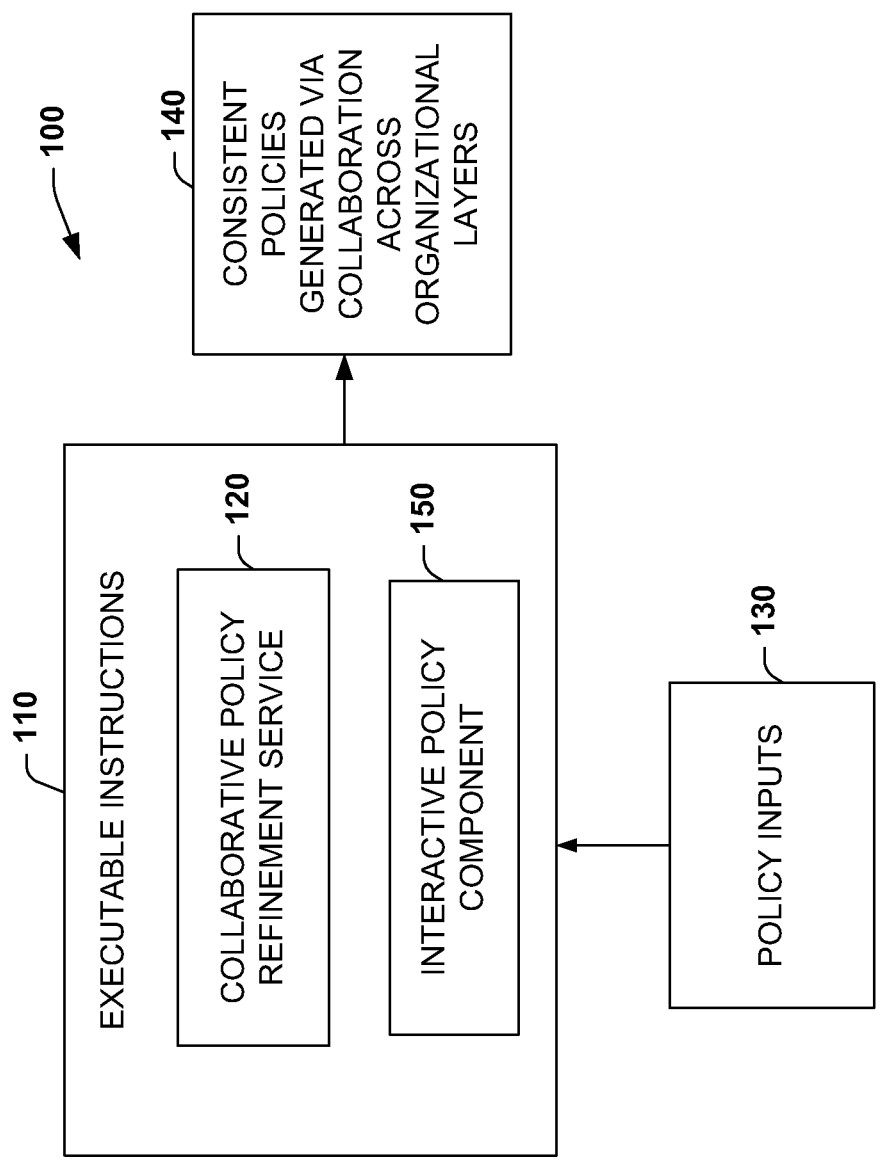
FIG. 1 illustrates an example of a computer readable medium having machine readable instructions for a collaborative policy refinement service.

FIG. 1 illustrates an example system 100 for generating security and privacy policies. The system 100 includes executable instructions 110 that provide various functionality for generating security or privacy policies for an organization. In one example, this includes a machine readable medium 110 comprising machine readable instructions. Such instructions can include a collaborative policy refinement service 120 to aggregate policy inputs 130 from organizational layers and to generate security policies 140 that are consistent across the organizational layers. The policy inputs 130 may include interface data generated from various users in an organization, where such interface data defines a policy (e.g., what role is required such as manager or supervisor who may access a database) for the associated layer of the organization. For example, an organizational layer may include a database that is associated with a level of an organization such as a legal level, business level, security level, privacy level, information technology level, research level, engineering level, production level, marketing level, and so forth, where each layer or level can generate or implement a policy for the organization.

An interactive policy component 150 facilitates collaborative interaction between the organizational layers and determination of constraints associated with the generated security policies 140. For example, a user at a lower layer in the organization (e.g., Information Technology level) may attempt to implement a policy but the collaborative policy refinement service 120 determines that such policy is not consistent or conflicts with some higher level policy (e.g., legal level) and notifies the user of such conflict. The user may then employ the interactive policy component 150 to determine why there is a conflict and how to resolve it with an upper layer user or system where the conflict may exist or is detected. Thus, the interactive policy component 150 can be utilized to determine limitations or constraints when attempting to implement a policy at a given level of an organization.

In an example of the interactive policy component 150, the user may be provided with an automatically generated e-mail or real time audio or video dialog where they can be connected with users and/or systems associated with the upper layers where the conflicts may reside. Thus, the users can query via the interactive policy component 150 on why the conflict exists (or why their actions are constrained in a given manner) and how to suitably resolve it. As used herein, the term consistent indicates that the policy 140 that is generated for one layer or level of an organization is correlated or compatible with other layers of the organization. For example, the highest level of an organization might be a legal level that defines legal policies for the rest of the organization to follow and thus, levels below the highest levels are bound or constrained by such policies or rules that implement the respective policies.

In an example, a user attempting to create a policy at another level such as at a business level would not be able to create a policy that did not satisfy or was incompatible with the legal or upper level, for example. Thus, the collaborative policy refinement service 120 facilitates that policy input 130 from one level or hierarchy of the organization is compatible or consistent with other levels of an organization. If a security or privacy policy conflict (e.g., policy incompatibility between layers) is detected between organizational layers by the collaborative policy refinement service 120, the interactive policy component 150 can facilitate resolution of such conflicts. For example, the interactive policy component 150 can process queries from user interfaces(described below with respect to FIG. 2) that answer why an attempted policy implementation or change is incompatible or inconsistent with some other policy in the organization. Automated and interactive policy suggestions can be provided by the interactive policy component 150 to help resolve policy incompatibilities between layers. For example, the interactive policy component 150 may generate a message describing why an attempted policy input 130 is not consistent or compatible with some other level of the organization. More than merely highlighting a policy conflict, the interactive policy component 150 can interactively guide users or systems on alternative policy decisions or selections that would also satisfy policy constraints imposed by some other layer of the organization (e.g., provide alternative policy templates that are predetermined to be compatible with upper layers).

As will be described below with respect to FIG. 2, an interface can be provided that is associated with a stakeholder assigned to the organizational layer, wherein the interface facilitates further collaboration with the interactive policy component 150. This can include instructions that enable definition and refinement of the security policies 140 at differing levels of abstraction by tracking dependencies of policy across the organizational layers. For instance, templates can be provided that enable mapping between the organizational layers and the security policies 140. The interface can also enable creation of security policies that are defined by a user's role and enables users to define dependency links between policies and the organizational layers. The interface can be modified according to the user's role and provides monitoring, alerts, or violations associated with definition of security policy. The interface can also share the monitoring, alerts, or violations to other members of an organization.

For purposes of simplification of explanation, in the present example, different components of the system 100 are illustrated and described as performing different functions. However, one of ordinary skill in the art will understand and appreciate that the functions of the described components can be performed by different components, and the functionality of several components can be combined and executed on a single component. The components can be implemented, for example, as software (e.g., computer executable instructions), hardware (e.g., an application specific integrated circuit), or as a combination of both (e.g., firmware). In other examples, the components could be distributing among remote devices across a network as describe in more detail below with respect to FIG. 2.

Figure 2:
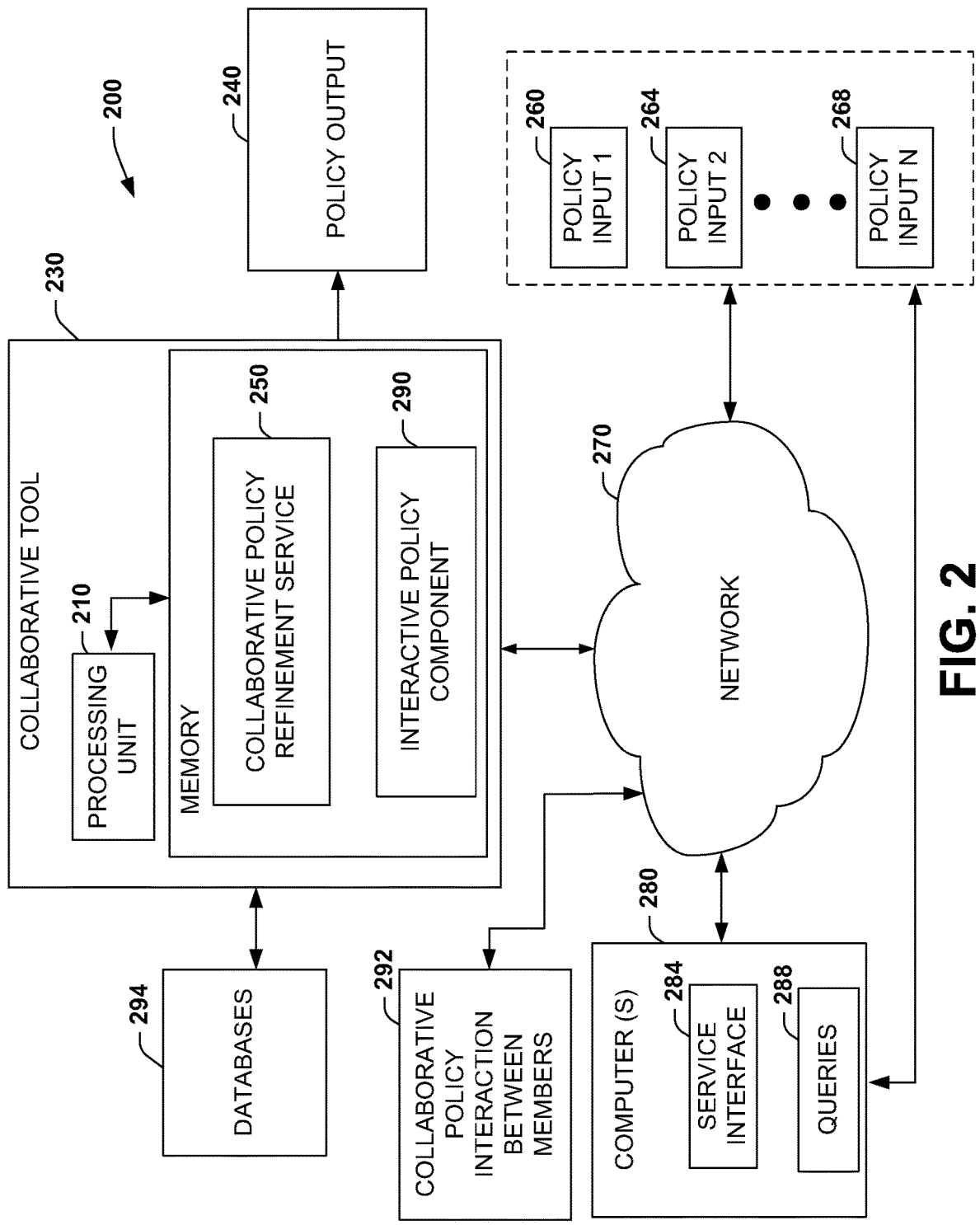
FIG. 2 illustrates an example of a system for a collaborative policy refinement service.

FIG. 2 illustrates an example of a system 200 for a collaborative policy refinement service. The system 200 includes a processing unit 210 (or processor) that executes instructions from a memory 220 that includes firmware or other storage media for storing computer executable instructions associated with a computer. The processing unit 210 and memory 220 can be provided as part of a collaborative tool 230 that is employed to generate security or privacy policy output 240 that can be applied across various levels or layers of an organization. A collaborative policy refinement service 250 is configured to receive policy inputs 260-268 from a level of an organization, where the policy input is analyzed to determine compatibility with other levels of the organization. Such policy inputs 260-268 can be gathered from various levels of the organization across a network 270 and via computers 280 configured with a service interface 284 that can also process queries 288 between the respective levels. An interactive policy component 290 is configured to receive the queries 288 related to the policy input 260-268, where the queries facilitate determination of compatibility or constraints imposed by other levels of the organization. As shown, collaborative policy interactions 292 may occur between members or systems of an organization via the service interface 284 and/or queries 288. After collaboration, the policy output 240 is configured to control security and privacy access to the organization, where the policy output is refined based in part on the policy input 260-268 and the queries 288 to be compatible across the levels of the organization.

In one example, the system 200 facilitates collaborative interaction between members of an organization at 292 having differing backgrounds and goals. For instance, one member of a lower tier in the organization may desire to generate a local policy 240 for access to a local subsystem of computers. As policies 240 are being created for the lower tier, the collaborative policy refinement service 290 analyzes the policy inputs 260-268 to determine if such policy is compatible with other levels of the organization, where such policy and organizational data can be maintained in various databases 294. Such policy, if incompatible can then be collaboratively refined via the interactive policy component 290. For example, the queries 288 can be generated via the service interface 284 to enable collaborative policy interaction at 292. The query 288 could include asking a question regarding why an attempted policy decision is in conflict with some other system or policy constraint. In response to the query 288, the interactive policy component 290 may attempt to contact an expert regarding the query or automatically attempt to guide the user regarding alternative policy selections that may be available and are consistent with other goals of the organization. Such back and forth collaboration at 292 could happen concurrently or be scheduled for some later time such as generating an e-mail to a corporate user requesting further guidance with respect to policy inputs 260-268.

Figure 3:
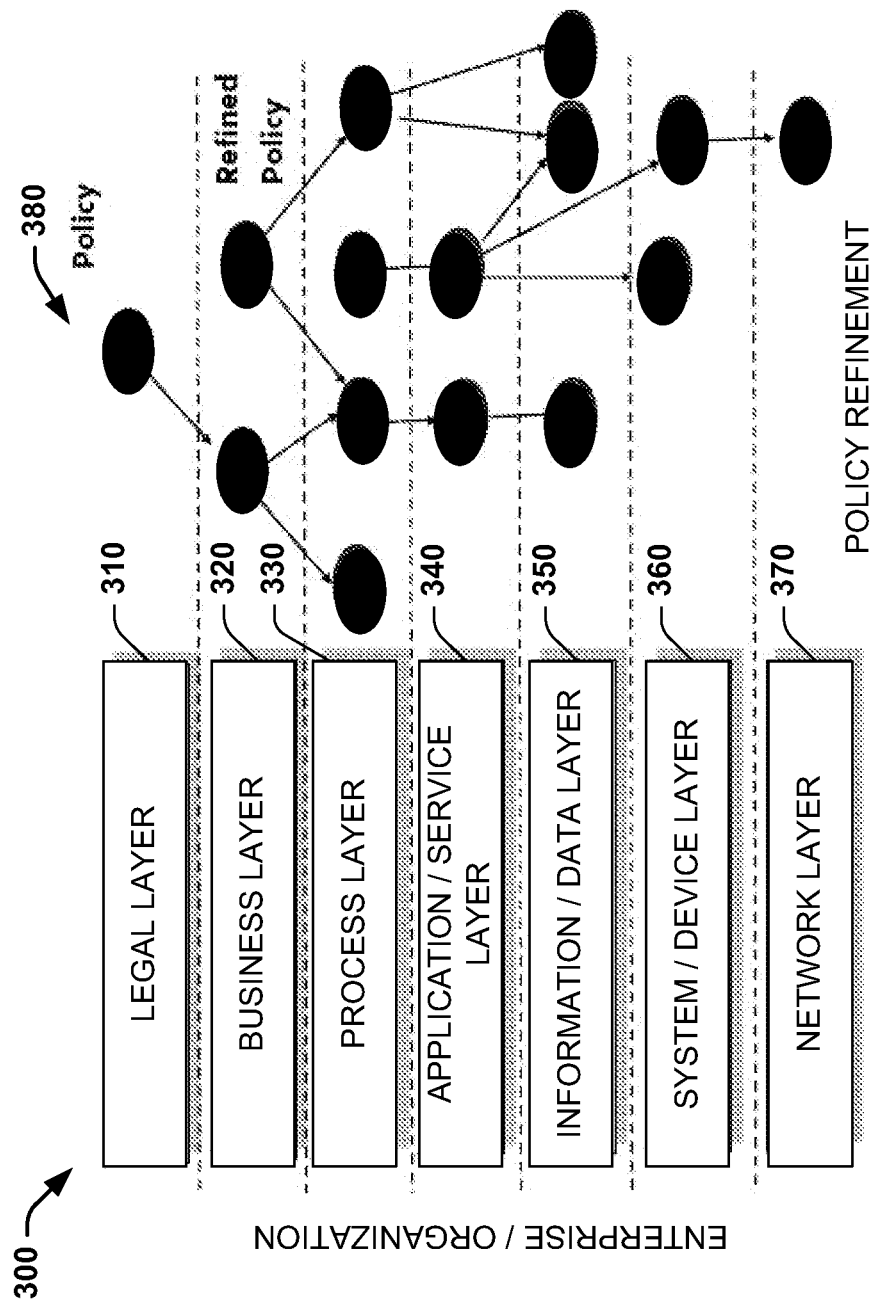
FIG. 3 illustrates example layers of an organization that can be employed for policy refinement.

FIG. 3 illustrates example layers 300 of an organization that can be employed for policy refinement. As shown, the example layers 300 can include a legal layer 310, a business layer 320, a process layer 330, an application/service layer 340, an information/data layer 350, a system/device layer 360, and a network layer 370. Other layers can be provided as well. Policy refinement is shown over various levels of an organization hierarchy 380 that are associated with the layers 300. In general, policy inputs appearing at higher levels of the hierarchy 380 are controlling over those at lower levels. Other controlling relationships are also possible such that one policy in a given tier of the hierarchy 380 may be controlling over another policy on the same tier (e.g., left branch policy controls those branches to the right on the same tier).

The layers 300 and hierarchy 380 can be associated with a collaborative service as described above at 250 of FIG. 2 for privacy and security policy refinement. This collaborative service brings together different stakeholders with different backgrounds. It provides them with a common, consistent environment in which to explore policies, link related concepts and policies at different levels of abstraction, and argue and dispute in a collaborative manner. It enables the definition and refinement of policies at different levels of abstraction by tracking dependencies of concepts defined at these different levels. Different policy templates are made available at different levels of abstraction and mapping criteria. There is also support in terms of automation to map concepts at different levels based on templates and to form policies. In one aspect, an organization employs the policy refinement service where multiple stakeholders create security and privacy policies and ensure their consistency and compatibility. For instance, the layers 300 show the complexity of dealing with current organizational policies, in the sense that there are different possible layers of definition and multiple levels of refinement. For each of these policy layers, there could potentially be an additional group of stakeholders that may desire to express or review policies at this level, although stakeholders may also desire to deal with more than one layer.

Figure 4:
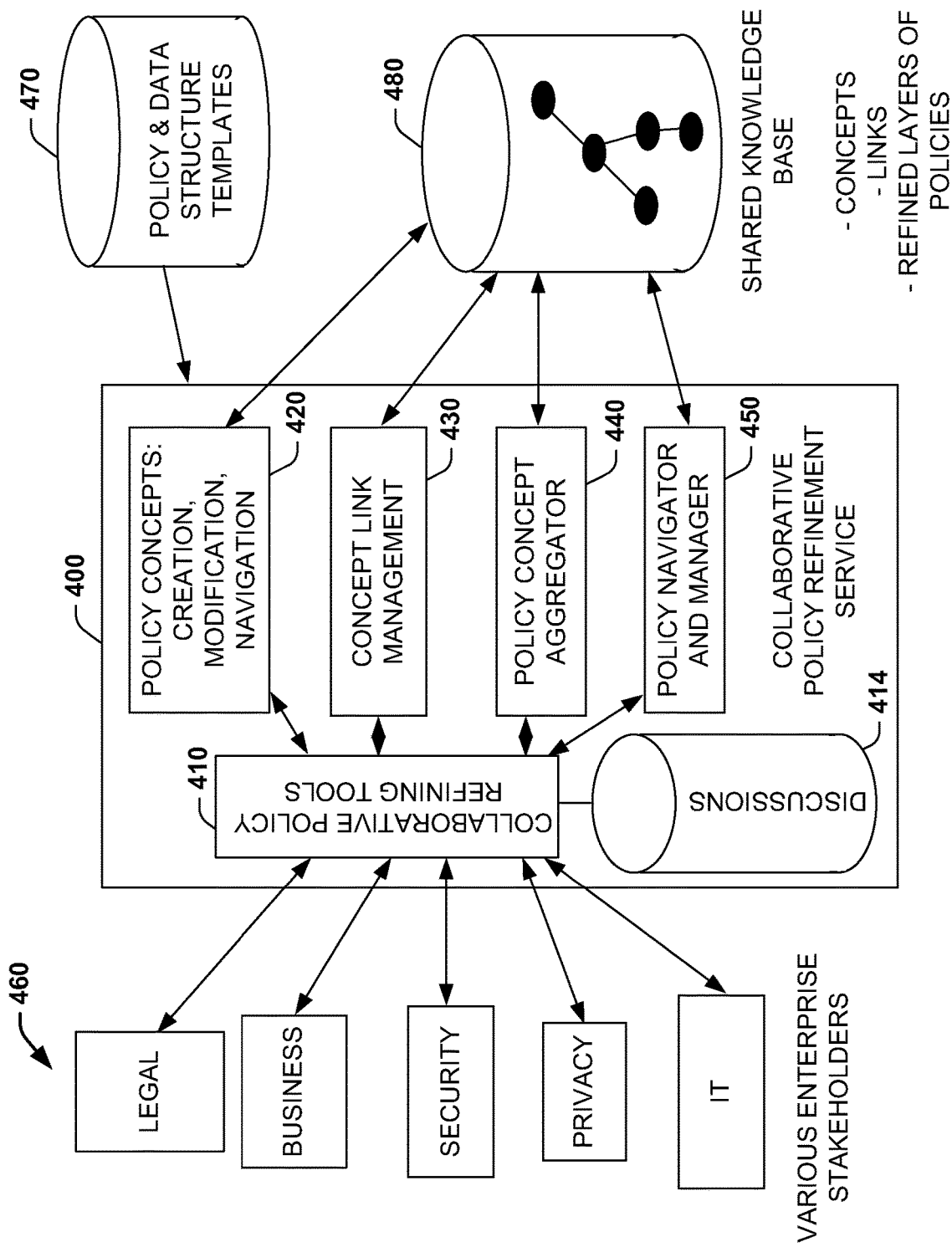
FIG. 4 illustrates an example of collaborative policy refinement service.

FIG. 4 illustrates an example of a collaborative policy refinement service 400. The service 400 includes policy refining tools 410, a discussions database 414, a policy concepts creation component 420, a concept link management component 430, a policy concept aggregator 440, and a policy navigator and manager 450. The service 400 receives policy input from various layers at 460, from policy data & structure templates 470, and from a shared knowledge base 480 of concepts, links, and refined layers of policies.

Multiple stakeholders can access and interact with the service 400. The service 400 manages a central repository of concepts based on inputs received from the stakeholders, and a repository of policies that are expressed or refined as a result of the inputs. A set of predefined concept and policy templates are provided at 470 but new templates can be introduced. They provide a first abstraction for concepts at different levels, in order to initiate policy discussions and refinements. The system supports a semi-automated mapping of high-level concepts to lower level concepts but ultimately stakeholders can collaboratively create dependency links between these concepts at different level of abstractions, derive related requirements and cluster concepts (and requirements) into policies, potentially driven by these templates.

There can be a centralized and common knowledge base 480 and information that is generated by various enterprise stakeholders. A stakeholder defines concepts and requirements at the level of expertise defined by their role at a given layer of the organization. They can navigate and explore concepts defined at a higher or lower level. In this context, they can interact with other stakeholders (operating at different levels of abstraction) and ask for clarification and more detail. These discussions can be tracked and stored at 414. This enables stakeholders to collaboratively refine concepts and introduce dependency links between them (either at the same level, or across levels). A functionality provided by this service is that a stakeholder can then aggregate concepts (and related requirements, documentation, details, and so forth) into policies by potentially using predefined templates (e.g., guidelines). In a similar manner to the processing of concepts, stakeholders can revise, raise points and debate these policies with other stakeholders, create dependency links between them and potentially identify conflicts and inconsistencies. The impact of changes of concepts or policies across different levels of abstraction can be automatically tracked by the service 400 by using dependencies. Involved stakeholders are notified, hence enabling further discussions and potential refinement across various abstraction levels.

The collaborative service 400 provides different user interfaces (UIs) and support capabilities, tailored to the different roles and background of different stakeholders. A view of the overall refinement chain is provided to involved stakeholders for review, debates and changes. An example of high-level policies is the set of data protection principles set out by legislative acts, for example (e.g., UK Data protection act). Conceptually, privacy and security concepts can be bundled together in a lower-level uniform representation: for example, policies can be defined at a more refined level of abstraction using an IF THEN . . . representation corresponding to one aspect of these principles, such as: Target: Personal Data DIF (Data Requestor is User U/Role R in Context C) AND (Data Requestor wants to access personal data D for Purpose P) AND (data subject has given consent for this data) THEN Allow Access to X ELSE Deny Access. These requirements and policies are mappable into enforceable technical policies in languages such as XACML, for example. The output of the service 400 can be a set of hierarchical concepts and policies. The lowest level of policies is mapped to different operational control points: enforcement, monitoring, compliance checking, and so forth.

Figure 5:
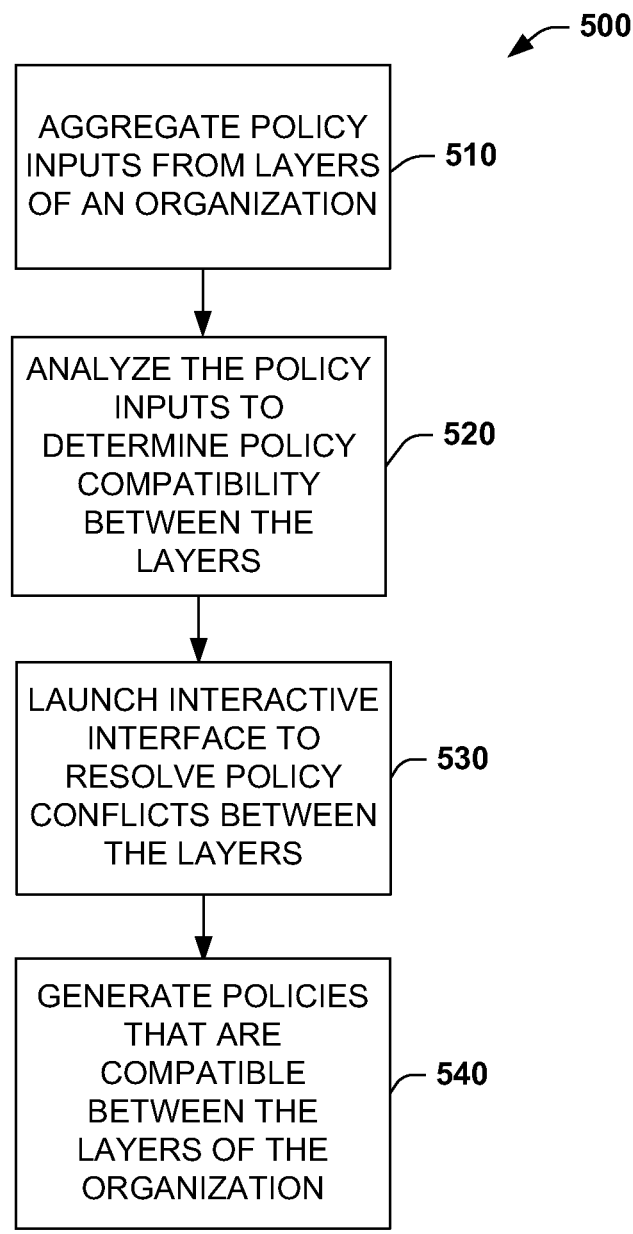
FIG. 5 illustrates a flowchart of an example method for generating collaborative policies.

In view of the foregoing structural and functional features described above, an example method will be better appreciated with reference to FIG. 5. While, for purposes of simplicity of explanation, the example method of FIG. 5 is shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method.

Figure 6:
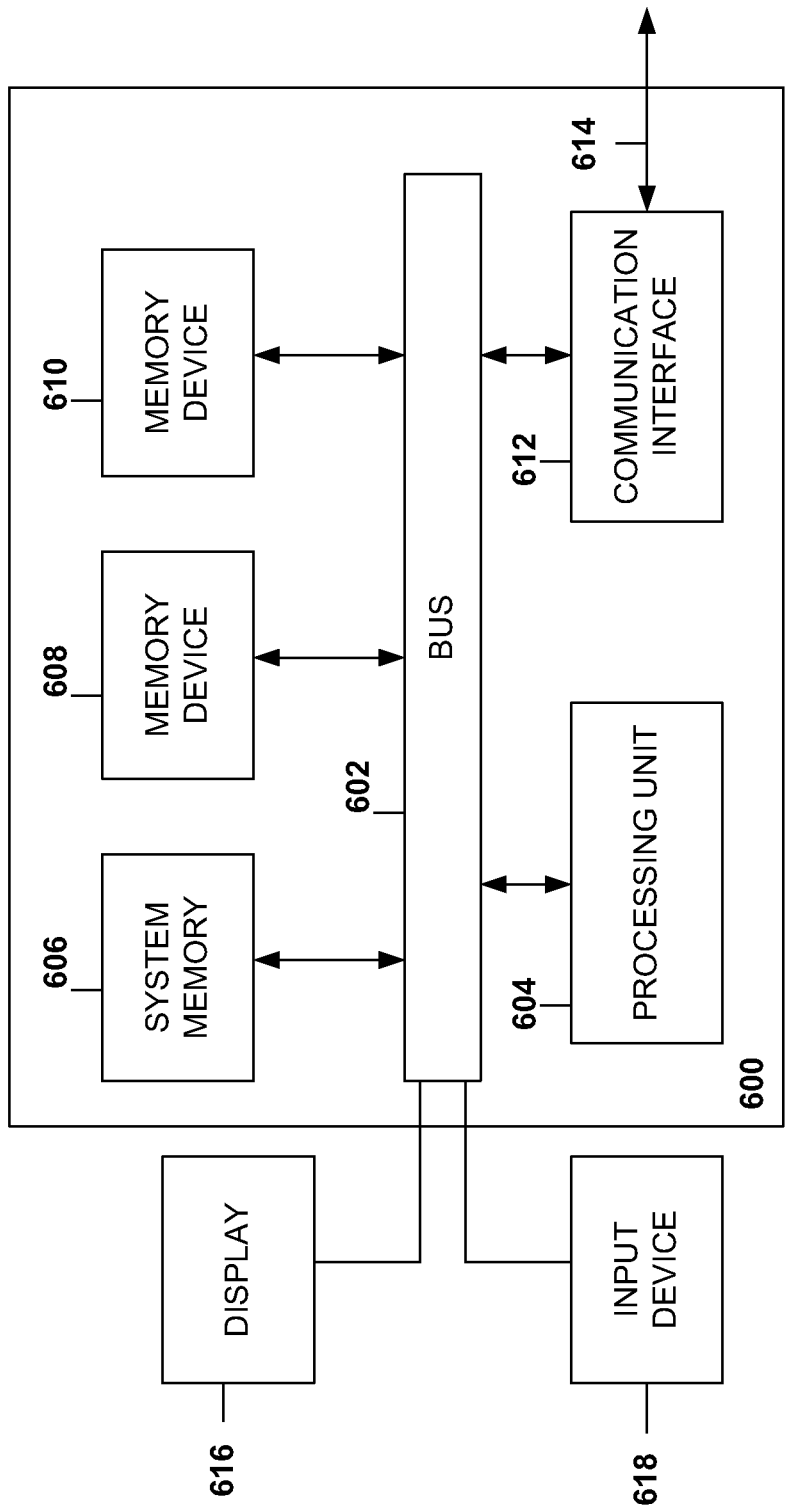
FIG. 6 illustrates an example of a computer system that can be employed to implement the systems and methods illustrated in FIGS. 1-5.

FIG. 5 illustrates an example method 500 for generating collaborative policies. The method 500 can be executed by a computer, for example. At 510, the method 500 includes aggregating policy inputs from layers of an organization. For example, this can occur at user interfaces such as described above with respect to FIG. 2. At 520, the method 500 includes analyzing the policy inputs to determine policy compatibility between the layers. For example, this can include utilizing a collaborative policy refinement service to determine of there are discrepancies or conflicts between layers or within layers themselves. At 530, the method 500 includes launching an interactive interface to resolve policy conflicts between the layers. For example, this can include employment of an interactive policy component that automatically connects users and systems at various layers of an organization for further collaboration and discussion to resolve policy issues. At 540, the method 500 includes generating policies that are compatible between the layers of the organization. For example, this can include employing a collaborative tool that utilizes input from a collaborative policy refinement service and an interactive policy component to generate policies that are consistent or compatible across an organization, FIG. 6 is a schematic block diagram illustrating an example system 600 of hardware components capable of implementing examples disclosed in FIGS. 1-5. The system 600 can include various systems and subsystems. The system 600 can be a personal computer, a laptop computer, a workstation, a computer system, an appliance, an application-specific integrated circuit (ASIC), a server, a server blade center, a server farm, a mobile device, such as a smart phone, a personal digital assistant, etc.

The system 600 can include a system bus 602, a processing unit 604, a system memory 606, memory devices 608 and 610, a communication interface 612 (e.g., a network interface), a communication link 614, a display 616 (e.g., a video screen), and an input device 618 (e.g., a keyboard and/or a mouse). The system bus 602 can be in communication with the processing unit 604 and the system memory 606. The additional memory devices 608 and 610, such as a hard disk drive, server, stand alone database, or other non-volatile memory, can also be in communication with the system bus 602. The system bus 602 operably interconnects the processing unit 604, the memory devices 606-610, the communication interface 612, the display 616, and the input device 618. In some examples, the system bus 602 also operably interconnects an additional port (not shown), such as a universal serial bus (USB) port.

The processing unit 604 can be a computing device and can include an application-specific integrated circuit (ASIC). The processing unit 604 executes a set of instructions to implement the operations of examples disclosed herein. The processing unit can include a processor core.

The additional memory devices 606, 608 and 610 can store data, programs, instructions, database queries in text or compiled form, and any other information that can be needed to operate a computer. The memories 606, 608 and 610 can be implemented as computer-readable media (integrated or removable) such as a memory card, disk drive, compact disk (CD), or server accessible over a network. In certain examples, the memories 606, 608 and 610 can comprise text, images, video, and/or audio.

Additionally, the memory devices 608 and 610 can serve as databases or data storage. Additionally or alternatively, the system 600 can access an external system (e.g., a web service) through the communication interface 612, which can communicate with the system bus 602 and the communication link 614.

In operation, the system 600 can be used to implement, for example, a client computer, a printer server, and at least some components of printers the can be employed in a system that manages a print job. Computer executable logic for implementing the system 600 can reside in the system memory 606, and/or in the memory devices 608 and/or 610 in accordance with certain examples. The processing unit 604 executes one or more computer executable instructions originating from the system memory 606 and the memory devices 608 and 610. The term "computer readable medium" as used herein refers to a medium that participates in providing instructions to the processing unit 604 for execution.

What have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims.

What is claimed is:

1. A non-transitory machine readable medium comprising instructions that upon execution cause a system to:
   receive policy inputs from organizational layers;
   determine, by a collaborative policy refinement service based on the policy inputs, that a first security policy of a first organizational layer of the organizational layers is incompatible with a second security policy of a second organizational layer of the organizational layers;
   launch a user interface in response to the incompatibility of the first security policy with the second security policy;
   receive, by an interactive policy component, a user-generated query regarding the incompatibility of the first and second security policies;
   provide, by the interactive policy component in response to the user-generated query, a response including information relating to a resolution for the incompatibility of the first and second security policies, the information generated by the interactive policy component responsive to the user-generated query;
   refine, by the collaborative policy refinement service, the first security policy to produce a refined first security policy, based on the policy inputs and the response and based on tracking dependencies of a plurality of security policies across the organizational layers, the plurality of security policies comprising the first and second security policies, the refining comprising creating a dependency link between the first security policy of the first organizational layer and another security policy of a different organizational layer, and the first security policy refined to be compatible across the organizational layers;
   apply the refined first security policy; and
   provide templates that enable mapping between the organizational layers and the plurality of security policies.

2. The non-transitory machine readable medium of claim 1, wherein the organizational layers comprise a plurality of layers selected from among a legal layer, a business layer, a process layer, an application/service layer, an information/data layer, a system/device layer, or a network layer.

3. The non-transitory machine readable medium of claim 1, further comprising an interface that is associated with a stakeholder of an organizational layer of the organizational layers, wherein the interface facilitates collaboration with the interactive policy component.

4. The non-transitory machine readable medium of claim 3, wherein the interface enables creation of security policies that are defined by a user's role.

5. The non-transitory machine readable medium of claim 4, wherein the interface is modified according to the user's role.

6. The non-transitory machine readable medium of claim 4, wherein the interface provides monitoring and alerts associated with definition of a security policy.

7. The non-transitory machine readable medium of claim 6, wherein the interface shares the monitoring and the alerts with other members of an organization.

8. The non-transitory machine readable medium of claim 1, wherein the instructions upon execution cause the system to launch a user interface in response to determining the incompatibility of the first security policy with the second security policy, and wherein the user-generated query is received through the user interface.

9. The non-transitory machine readable medium of claim 1, wherein the policy inputs comprise data defining the plurality of security policies.

10. The non-transitory machine readable medium of claim 1, wherein the instructions upon execution cause the system to send a notification regarding the incompatibility of the first security policy with the second security policy, and wherein the user-generated query is responsive to the notification.

11. A method, comprising:
    aggregating, by a computer, policy inputs from layers of an organization;
    analyzing, by the computer, the policy inputs to determine policy compatibility between the layers;
    in response to determining a policy conflict between a plurality of policies of different layers of the layers, launching, by the computer, an interactive user interface to resolve the policy conflict;
    sending, by the computer, a notification of the policy conflict;
    receiving, by the computer through the interactive user interface, a user-generated query relating to the policy conflict between the plurality of policies;
    sending, by the computer in response to the user-generated query, a response including information relating to a resolution of the policy conflict;
    generating, by the computer as part of the resolution of the policy conflict and in response to the information relating to the resolution of the policy conflict, policies that are compatible between the layers of the organization, wherein the generating comprises refining a first policy of the plurality of policies at differing levels of abstraction by tracking dependencies of the plurality of policies across the layers of the organization, the refining comprising creating a dependency link between the first policy of a first layer of the layers and another policy of a different layer of the layers, and the first policy refined to be compatible across the layers;
    controlling, by the computer, access to a system using the refined first policy; and
    providing templates that enable mapping between the layers of the organization and the plurality of policies.

12. The method of claim 11, further comprising creating policies that are in accordance with a user's role.

13. The method of claim 11, further comprising applying the plurality of policies across the layers of the organization.

14. A system, comprising:
a processor; and
a non-transitory storage medium storing computer executable instructions executable on the processor to:
- receive, by a collaborative policy refinement service, a policy input from a first level of an organization;
- analyze, by the collaborative policy refinement service, the policy input to determine compatibility of a first policy of the first level of the organization with a second policy of a second level of the organization;
- launch a user interface in response to incompatibility of the first policy with the second policy;
- provide, by the collaborative policy refinement service, a notification of the incompatibility of the first policy with the second policy;
- receive, by an interactive policy component, a user-generated query that is responsive to the notification of the incompatibility;
- provide, by the interactive policy component in response to the user-generated query, a response including information relating to a resolution for the incompatibility;
- refine, by the collaborative policy refinement service, the first policy based in part on the policy input and the information relating to the resolution for the incompatibility, and further based on tracking dependencies of a plurality of policies across levels of the organization, the plurality of policies comprising the first and second policies, the refining comprising creating a dependency link between the first policy of the first level and another policy of a different level of the organization, and the first policy refined to be compatible across the levels of the organization;
- control access to a computer system using the refined first policy; and
- provide templates that enable mapping between the levels of the organization and the plurality of policies.

* * * * *